Patented Feb. 16, 1937

2,070,575

UNITED STATES PATENT OFFICE 2,070,575

BINDING AGENT FOR PHOTOGRAPHIC EMULSIONS AND METHOD OF PREPARING SAME

Benno Bochskandl, Hamburg, Germany, assignor, by mesne assignments, to International Patents Development Company, Wilmington, Del., a corporation of Delaware No Drawing. Application June 29, 1933, Serial No. 678,319. In Germany January 28, 1933

11 Claims. (Cl. 95—7)

This invention relates to the production of photographic emulsions.

One object of the invention is to cheapen the manufacture of these emulsions, whilst a further object is to increase the adhesive powers thereof and their resistance to temperature.

As well known, the usual gelatine emulsions adhere to the backing of the film, particularly if the latter is composed of nitro-cellulose, in very deficient manner, so that it is necessary to furnish the backing with a preparation which ensures connection between the same and the coating of emulsion. On the other hand gelatine emulsions, regardless of the backing to which the same are applied, whether this be glass, film or paper, possess the disadvantage that they are extremely sensitive to increases in temperature, for which reason a hardening of the coating is usually performed, particularly in the case of so-called tropical emulsions. This hardening, however, which amounts to a tanning of the gelatine colloid also possesses the disadvantage that the coating is not readily pervious to liquid, thus impairing the requisite treatment in the baths.

According to the invention, these disadvantages are overcome by employing as a photographic emulsion, or emulsion for similar purposes, a mixture of film-forming, pourable, disintegrated starch and gelatine with a hardening agent, such as chrome-alum, to which there are naturally added when the emulsion is to be used for photographic purposes and, before the emulsion is poured, the constituents necessary for forming the light-sensitive salts.

A preferred method of producing the binding agent consists in at first boiling the disintegrated film-forming starch with water, admixing the product when still hot with the hardening agent, for example chrome-alum, and then adding to the somewhat cooled mass the gelatine solution.

It has already been proposed to add to photographic emulsions starch in dry, unsoaked or also in paste-like condition. This, however, did not refer to a disintegrated film-forming starch, whilst the same is also intended for a wholly different purpose, viz., an opalization of the emulsion. In this connection additions of starch are sufficient in such a small quantity that the ability to pour the emulsion is not appreciably affected. In contradistinction thereto it is the object of the invention to replace the gelatine to a large extent in photographic emulsions by a starch which has been disintegrated to such extent as to impart film-forming properties to the same. It is a surprising feature that the ability to pour the emulsion is not affected even if large quantities of this starch are employed with small amounts of gelatine.

*Example.*—Washed corn starch in approximately 35% solution is disintegrated for approximately 12–15 hours under continuous agitation with a watery alkaline sodium hypochlorite solution at ordinary temperature, and then washed and dried. The dilute character of the sodium hypochlorite solution prevents change in the starch molecules to a point where the starch product is readily soluble in water. 7 grammes of this disintegrated film-forming starch are heated with approximately 50–55 ccm. distilled water in a water bath, with suitable agitation, the same serving to produce 100 grammes photographic emulsion when ready for pouring. When a temperature of 75° C. has been reached there are added 8 ccm. chrome-alum solution (1:50), previously admixed with ammonia, until a weak clouding takes place.

Heating is now additionally performed up to 80–85°. In the meantime the gelatine (ordinary commercial emulsion gelatine) is prepared for soaking, 1 gramme gelatine being soaked in 30 grammes distilled water. In the water there is dissolved at the same time the necessary amount of bromide of potassium. After soaking the gelatine is dissolved by heating to approximately 60° C. This gelatine solution is stirred well into the starch solution, which also has a temperature of approximately 60°. After the two solutions have been mixed together there is added the requisite amount of silver nitrate, dissolved in 10 ccm. water. The emulsion having been prepared in the described fashion, the same is cooled, and pouring takes place at approximately 27°–28° C. Before pouring, the soluble salts, if desired, may be removed in the manner known per se by coagulating the emulsion and washing the same in water, and then melting the same again by heating.

It is obvious that all operations after the formation of the light-sensitve silver bromide require to be performed in a dark room.

In the above example the ratio between the air-dried starch and the air-dried gelatine amounts, in weight, to 1:7. It will be obvious, however, that other proportions may be employed dependent on the requirements placed on the emulsion. Thus, for example, the coagulation may be greatly increased by increasing the proportion of gelatine. In this case, however, the other constitutents, and particularly the proportion of the hardening agent, must be adapted accordingly.

The proportion of gelatine, however, is important. If the gelatine were omitted entirely, the mass would lose its solidifying powers and accordingly also its ability of being poured, and would not be suitable for the usual manipulations performed in the preparation of the emulsion, viz., the washing and coagulation, melting, and pouring with the immersed roller and plate pourer, for which purpose, as well known, a distinct solidifying point is absolutely essential. Adjustment of the solidifying point to a certain pouring temperature may be performed by varying the proportions of the substances.

It will be understood that no restriction is made to the particular example quoted, and that various modifications are quite possible within the meaning of the above description and the annexed claims without departing from the spirit of the invention.

What I claim as new and desire to secure by Letters Patent is:

1. A coherent insoluble transparent substance consisting of a chromated compound of gelatin and film-forming, substantially cold water insoluble, disintegrated starch.

2. A photographic film consisting of a chromated compound of film-forming, substantially cold water insoluble, disintegrated starch, and gelatin in which a light sensitive salt is incorporated.

3. Pourable emulsion for photographic and like purposes comprising an aqueous mixture of gelatin and a film-forming, substantially cold water insoluble, product of starch, together with a hardening agent.

4. Pourable emulsion for photographic and like purposes comprising an aqueous mixture of gelatin and a film-forming, substantially cold water insoluble, disintegration product of starch, together with chrome alum.

5. Method of producing a pourable emulsion for photographic and like uses which comprises: producing a film-forming starch product, substantially insoluble in cold water, by disintegrating starch by treatment with a dilute alkaline hypochlorite; treating the disintegrated starch with a hardening agent; and incorporating gelatin with the material.

6. Method of producing a pourable photographic emulsion which consists in heating a film-forming, substantially cold water insoluble, disintegration product of starch in water, adding to the mixture while hot a hardening agent and then adding to the somewhat cooled mass a gelatin solution, and finally a light sensitive salt.

7. Method of producing a pourable photographic emulsion which consists in heating a film-forming, substantially cold water insoluble, disintegration product of starch and water, adding to the mixture while hot chrome alum, and then adding to the somewhat cooled mass a gelatin solution, and finally a light sensitive salt.

8. Method of producing a pourable emulsion for photographic and like uses which comprises: producing a film-forming starch product, substantially insoluble in cold water, by disintegrating corn starch by treatment for twelve to fifteen hours at ordinary room temperature with a dilute alkaline hypochlorite; treating the disintegrated starch with a hardening agent and incorporating gelatin with the material in substantially the proportion of 1 part by weight of gelatin to 7 of starch.

9. Method of producing a pourable emulsion for photographic and like uses which comprises: producing a film-forming starch product, substantially insoluble in cold water, by disintegrating the starch in water with a dilute alkaline hypochlorite at ordinary room temperature; washing the disintegrated starch in water to a temperature of about 75° C.; adding chrome alum to the material and increasing the temperature of the same to about 80° to 85° C.; incorporating gelatin with the material; and cooling and pouring the mixture.

10. A cold water insoluble transparent photographic film consisting of a chromated compound of film-forming disintegrated starch and gelatin in which a light sensitive salt is incorporated, together with a hardening agent, the proportion between the gelatin and the disintegrated starch being substantially one part by weight of gelatin to seven of starch.

11. Method of producing a pourable emulsion for photographic and like uses which comprises: producing a film-forming starch product by disintegrating corn starch by treatment for twelve to fifteen hours at ordinary room temperature with a watery alkaline sodium hypochlorite solution, washing the disintegrated starch and drying the same, adding water to the dry starch and heating, with agitation, to approximately 75° centigrade; adding a chrome-alum solution to the material until a weak alkaline reaction results, at the same time increasing the temperature to about 80 to 85° centigrade; incorporating gelatin with the material in the proportion of approximately one part by weight gelatin to seven of starch; and cooling and pouring the mixture.

BENNO BOCHSKANDL.

CERTIFICATE OF CORRECTION.

Patent No. 2,070,575. February 16, 193

BENNO BOCHSKANDL.

It is hereby certified that error appears in the printed specification of the above numbered patent requiring correction as follows: Page 2, first column, line 34, claim 3, before the word "product" insert disintegrated; and that the said Letters Patent should be read with this correction there in that the same may conform to the record of the case in the Patent Office.

Signed and sealed this 30th day of March, A. D. 1937.

(Seal)

Henry Van Arsdale
Acting Commissioner of Patents.